United States Patent
Chakra et al.

(10) Patent No.: US 9,330,173 B2
(45) Date of Patent: May 3, 2016

(54) SITUATIONAL APPLICATION CREATION BASED ON OBSERVED USER BEHAVIOR

(75) Inventors: Al Chakra, Apex, NC (US); John Kenyon Gerken, III, Apex, NC (US); Roderick C. Henderson, Apex, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/426,458

(22) Filed: Apr. 20, 2009

(65) Prior Publication Data

US 2010/0268780 A1 Oct. 21, 2010

(51) Int. Cl.
G06F 15/16 (2006.01)
G06F 7/00 (2006.01)
G06F 17/30 (2006.01)
G06F 9/44 (2006.01)
H04L 29/08 (2006.01)
G06Q 10/10 (2012.01)

(52) U.S. Cl.
CPC ........ G06F 17/30861 (2013.01); G06F 9/4446 (2013.01); *G06F 17/3089* (2013.01); *G06Q 10/101* (2013.01); *H04L 67/02* (2013.01)

(58) Field of Classification Search
CPC H04L 67/02; G06Q 10/101; G06F 17/30861; G06F 17/3089; G06F 9/4446
USPC .......................... 709/206, 219; 707/708, 728
See application file for complete search history.

(56) References Cited

U.S. PATENT DOCUMENTS

| | | | |
|---|---|---|---|
| 7,908,278 B2* | 3/2011 | Akkiraju et al. | 707/748 |
| 2008/0222599 A1 | 9/2008 | Nathan | |
| 2009/0089709 A1* | 4/2009 | Baier et al. | 715/817 |
| 2009/0158166 A1* | 6/2009 | Dewar et al. | 715/745 |
| 2009/0328025 A1* | 12/2009 | Johnson et al. | 717/170 |
| 2010/0036814 A1* | 2/2010 | Kalasapur et al. | 707/3 |
| 2010/0100607 A1* | 4/2010 | Scholz et al. | 709/219 |
| 2014/0081962 A1* | 3/2014 | Lamba et al. | 707/728 |

OTHER PUBLICATIONS

Definition of Extensibility, TheFreeDictionary.com.*
Bitzer, S.; Ramroth, S.; Schumann, M., "Mashups as an Architecture for Knowledge Management Systems," in System Sciences, 2009. HICSS '09. 42nd Hawaii International Conference on , vol., no., pp. 1-10, Jan. 5-8, 2009.*
Ozkan, N.; Abidin, W.Z., "Investigation of mashups for managers," in Computer and Information Sciences, 2009. ISCIS 2009. 24th International Symposium on , vol., no., pp. 622-627, Sep. 14-16, 2009.*
Maximilien, E.M.; Ranabahu, A.; Gomadam, K., "An Online Platform for Web APIs and Service Mashups," in Internet Computing, IEEE , vol. 12, No. 5, pp. 32-43, Sep.-Oct. 2008.*
Leshed, Gilly et al., CoScripter: Automating & Sharing How-To Knowledge in the Enterprise, CHI Letters: Human Factors in Computing Systems, CHI 2008, 10(1): pp. 1719-1728.
Lau, Tessa, Social Scripting for the Web, Computer, Jun. 2007, 40(6): pp. 96-98.
Little, Greg et al., Koala: Capture, Share, Automate, Personalize Business Processes on the Web, CHI Letters: Human Factors in Computing Systems, CHI 2007, 9(1): pp. 943-946.
Eisenberg, Anne, Do the Mash (Even if You Don't Know the Steps), NY Times, Sep. 2, 2007.

* cited by examiner

*Primary Examiner* — Taylor Elfervig
(74) *Attorney, Agent, or Firm* — Jordan IP Law, LLC

(57) ABSTRACT

A system and method of creating a situational application provides for identifying content from a plurality of sources, where the content is associated with a user's interaction with the plurality of sources. Data associated with the identified content is gathered, and a situational application is generated based on the gathered data.

17 Claims, 3 Drawing Sheets

SITUATIONAL APPLICATION CREATION BASED ON OBSERVED USER BEHAVIOR

BACKGROUND

1. Technical Field

Embodiments of the present invention generally relate to situational applications. More particularly, embodiments of the invention relate to the creation of situational applications based on observed user behavior.

2. Discussion

In web development, a "mashup" can be a Web application that combines data from one or more sources into a single integrated tool. An example of a mashup could be the use of cartographic data from an online map service to add location information to real estate data, thereby creating a new and distinct Web service that was not originally provided by either source. Typically, the creation of a mashup may involve the recognition and selection of the desired components for the mashup and the combination of the selected components into the mashup.

Some approaches to combining the selected components may require substantial programming knowledge, which could be beyond the skill set of the typical end user. While other approaches might permit the use of more user-friendly mashup editors to combine the selected components, a number of challenges remain. For example, conventional mashup editors often require the user to be able to discover the components of the desired mashup, logically associate the components and their sources, logically define the interactions between the components, and decide which components ultimately to use in order to create the mashup.

BRIEF SUMMARY

Embodiments of the present invention provide for a computer-implemented method that provides for identifying content from a plurality of sources, wherein the content is associated with a user's interaction with the plurality of sources. Data associated with the identified content can be gathered and a situational application can be generated based on the gathered data.

Embodiments of the present invention also provide for a computer program product having a computer readable medium and computer usable code stored on the computer readable medium. The computer usable code may be configured to identify content from a plurality of web-based sources, where the content is to be associated with a user's interaction with the plurality of web-based sources. The computer usable code may also be configured to gather data associated with the content and generate a situational application based on the gathered data, potential views on that data and relationships between data elements.

Other embodiments of the present invention may also provide for a computer program product having a computer readable medium and computer usable code stored on the computer readable medium, wherein the computer usable code can be configured to record a user's web browsing session. The computer usable code may also be configured to identify content from a plurality of web sites visited during the user's web browsing session, where the content is to be associated with the user's interaction with the plurality of web sites. The content may be generated by a plurality of web-based applications on the plurality of web sites. The computer usable code can also be configured to switch to a passive browsing mode if content on a web site cannot be identified, or to gather data associated with the identified content. The data may include at least one of an identifier for each site in the plurality of web sites, a browsing frequency for each site in the plurality of web sites, and a browsing order corresponding to the plurality of web sites. The computer usable code may also be configured to generate a situational application based on the data, where the situational application can include one or more widgets and/or mashups. In addition, the computer usable code could be configured to prompt the user for additional content to include in the situational application and the manner in which the content is presented, and to update the situational application based on a response to the prompting.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
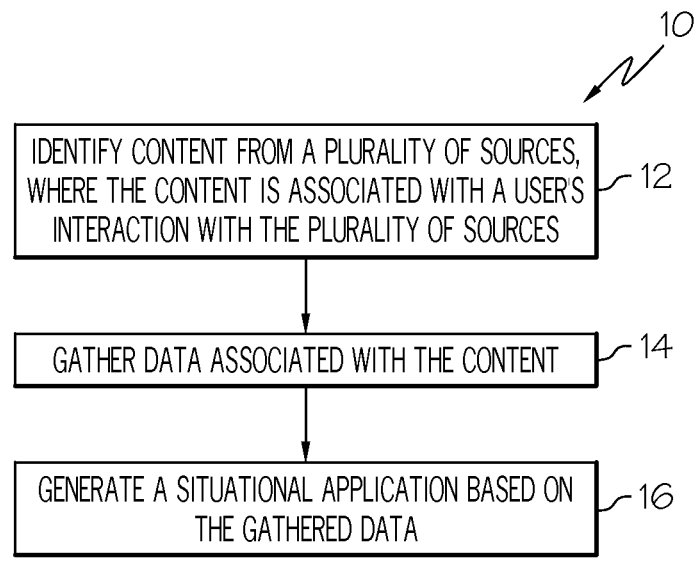
FIG. 1 is a flowchart of an example of a computer-implemented method of creating a situational application according to an embodiment of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a computer-implemented approach to creating a situational application is shown at method 10. In the illustrated example, processing block 12 provides for automatically identifying content from a plurality of sources, where the content is associated with a user's interaction with the plurality of sources. The plurality of sources could include applications such as Lotus Notes Calendar or database applications, or various web-based sources such as web sites, dashboards or portals, and the content might be generated by a plurality of applications on the sources. For example, the content can be generated by an instant messaging (IM) application, e-mail application, spreadsheet application, word processing application, search application, media application, login application, or any combination thereof. The content could also be a feed, form, blog or other content from a site such as a news-oriented web site. Identifying the content may involve recording the user's web browsing session.

Illustrated block 14 provides for gathering data associated with the identified content. In one example, the gathered data includes data such as an identifier (e.g., URL) for each content source. The gathered data may also indicate a browsing frequency for each source, so that the most frequently used sources may be identified for subsequent processing. Yet another example of the type of data that can be gathered is the order in which the various sources are accessed (e.g., browsing order). Thus, if the user has a certain routine or workflow, this information may be readily captured in block 14. The gathered data could also include metadata for activities conducted on the various sites visited, forms and feeds encountered on the sites visited, and IFrame components (e.g., by screen scraping any logical HTML container such as a DIV, FRAMESET, TABLE or BODY tag) of the sites visited. These examples are not exhaustive, and there are many other features that could be captured in block 14 and used as metrics to feed the heuristic that facilitates the determination of the appearance of the situational application.

A situational application can be generated based on the gathered data at block 16. The situational application could include one or more widgets, mashups, forms, feeds, textual content, IFrame components (e.g., elements and applications), etc., from any number of different sources. By way of example, the situational application generated in block 16 could present the user with a browser-based IM client, e-mail or other web-based application, and/or a specific spreadsheet or other document in a web-based editor. The situational application may also enable the user to read a blog or other news-oriented web site, and/or search on a given site and then iterate through the results. In addition, the situational application might perform some workflow to complete a task, such as logging into a computer in the morning or other time of day. The situational application could also perform a search on a given site to retrieve a specific, targeted piece of information. By automatically selecting the components of the situational application, the illustrated method 10 enables users without the technical skills that may be required to recognize logical associations among the components, to obtain a unique view of the assembled content.

Figure 2A:
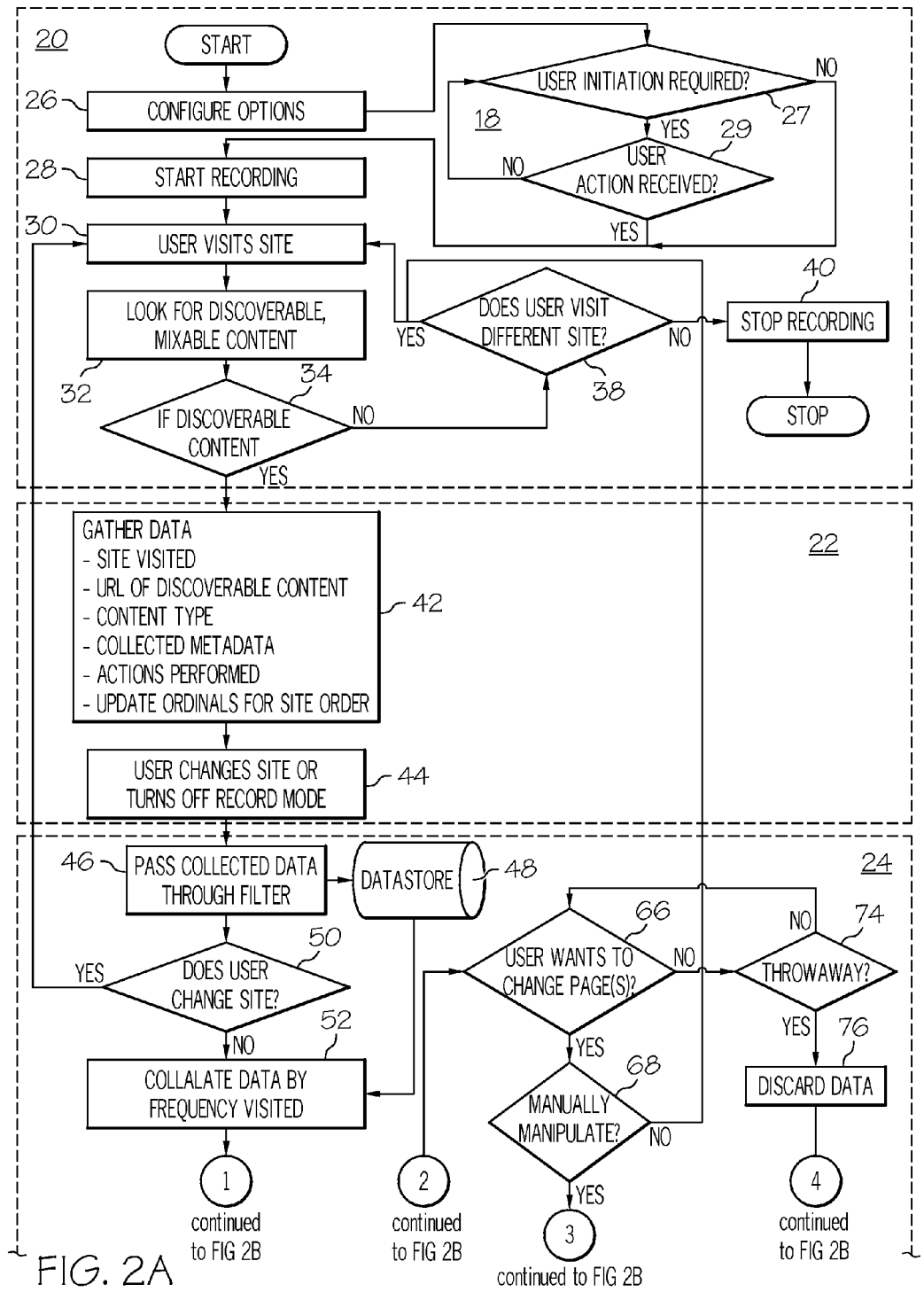
FIGS. 2A and 2B are a flowchart of a more detailed example of a computer-implemented method of creating a situational application according to an embodiment of the present invention.
Figure 2B:
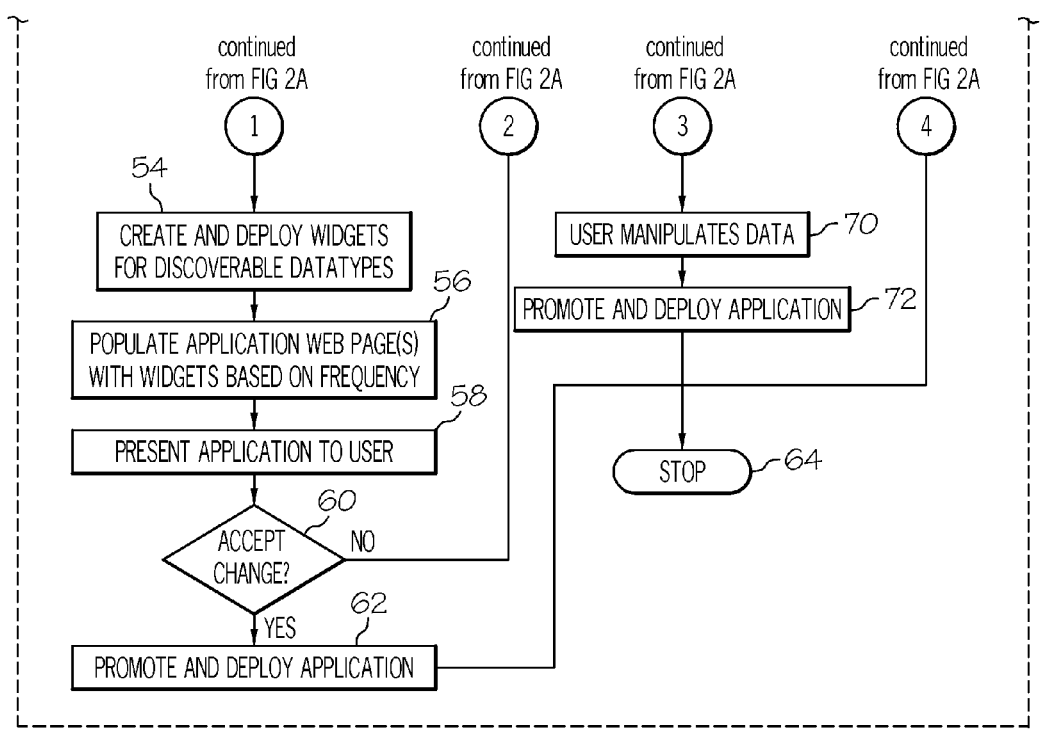

Referring now to FIG. 2, a more detailed example of a method 18 of creating a situational application is shown. In the illustrated example, generally, content from a plurality of web-based sources is identified at block 20, block 22 provides for gathering data associated with the content, and a situational application is generated based on the data at block 24. Thus, one or more of the illustrated blocks 20, 22, 24, may be readily substituted for blocks 12, 14, 16 (FIG. 1), already discussed, respectively, in whole or in part. In the illustrated example, block 26 provides for configuring the application options. For example, the user may configure the method 18 to target a specified situational application environment. Block 26 may also enable the user to include related information, such as user credentials and/or a permalink to the uniform resource identifier (URI) to contain the generated situational application or mashup.

Illustrated block 27 provides for determining whether user initiation of the process or some other affirmative action is required. The information for the determination at block 27 may be obtained in the configuration block 26, already discussed. If it is determined that user initiation is required, block 29 may provide for determining whether the user has acted. If so, block 28 may provide for recording the user's web browsing session. Illustrated Block 30 provides for detecting that the user has visited a site. The transition to the active recording state may occur overtly, by the passing of a predetermined start time as set by the user, or by other trigger as appropriate. Illustrated block 32 provides for automatically searching the current site for discoverable and mixable content. A number of criteria such as visibility criteria and inter-/intra-compatibility criteria may be used in block 32 to evaluate candidate content.

In this regard, there may be attributes exposed by web pages and other software programs that identify it as content that can be used directly in a situational application or converted to be such. For instance, some browsers detect feeds associated with web sites that publish them, where the feeds can include data or text. Moreover, online applications such as Google Spreadsheet can be easily identified and structured for reuse, and the content of SQL queries, web services calls and other SaaS activities can be observed by interrogating the embedded JavaScript content. URLs to other embedded content, such as videos, music, etc. may also readily be captured for incorporation into a situational application. Simply put, all of these components can be reused in a mashup ecosystem as part of a situational application. Other observable behaviors may also be tracked, as well as new forms of discoverable resources and other methods for discovering them. Accordingly, the illustrated method 18 is extensible and allows for external technologies to be incorporated into it to further its ability to create meaningful widgets and/or mashups to be included into targeted situational applications.

If it is determined at block 34 that the site does not have discoverable and mixable content, it can be determined at block 38 whether the user's browsing session is complete. If so, recording may be discontinued at block 40. Otherwise, the process of searching for discoverable content may repeat at blocks 30, 32 and 34.

If it is determined at illustrated block 34 that the site has discoverable and mixable content, block 42 may provide for gathering data such as an identification of the site visited, the URL of the discoverable content, the content type, the activities performed (e.g., text placed in input fields, selections made, credentials used, documents edited, etc.), the collected metadata regarding the activities performed, and the order in which the site was visited. When the user changes sites or deactivates the recording functionality at block 44, illustrated block 46 provides for passing the collected data through a filter and a datastore 48. Block 44 may also determine whether a predetermined end time has occurred or a predetermined time frame has elapsed. If it is determined at illustrated block 50 that the user has changed sites, the process of identifying content and collecting data repeats at block 20. Otherwise, the data may be collated based on the frequency visited at block 52.

Illustrated block 54 provides for the creation and deployment of widgets for discoverable datatypes. Situational application web page(s) may be populated with the widgets based on the frequency visited at block 56. The application may be presented to the user at block 58 and illustrated block 60 provides for determining whether the user has accepted the automated changes to the page. If so, the modified situational application can be promoted and deployed at block 62 and the process may be terminated at block 64. If the user does not accept the automated changes at block 60, illustrated block 66 provides for prompting the user for additional changes to the situational application page(s). For example, beyond suggesting additional content, the user could also modify the situational application in other ways, such as indicating a preference for one view on a piece of data over the one proposed, selecting a widget that couldn't fit within the available area over another, or reorganizing the layout of the existing widgets within the situational application. If the user indicates a desire to make changes to the application, block 68 may provide for determining whether the desired changes are manual changes. If so, illustrated block 70 enables the user to manipulate the data and the application may be promoted and deployed at block 72.

If it is determined at block 68 that the user does not wish to manually manipulate the application, the method 18 may return to the process of automatically identifying content at block 20. If it is determined at block 66 that the user does not wish to modify the application, illustrated block 74 provides for prompting the user to discard the automatically gathered data. If the user responds affirmatively, block 76 may provide for discarding the automatically gathered data.

Thus, the illustrated methods 18, 10 (FIG. 1), obviate any requirement for the user to be able to discover the components of the situational application, logically associate the components and their sources, or decide which components to use in order to create the situational application. The application creation process can therefore be more passive from the user perspective in that the user may merely activate the methods 18, 10 (FIG. 1) and visit sites and other sources as the user normally would. The illustrated methods 18, 10 (FIG. 1) can automatically build the situational application, widget and/or mashup based on observations made concerning the user's behavior rather than requiring the user to possess the skill to create the situational application, widget and/or mashup on their own.

Figure 3:
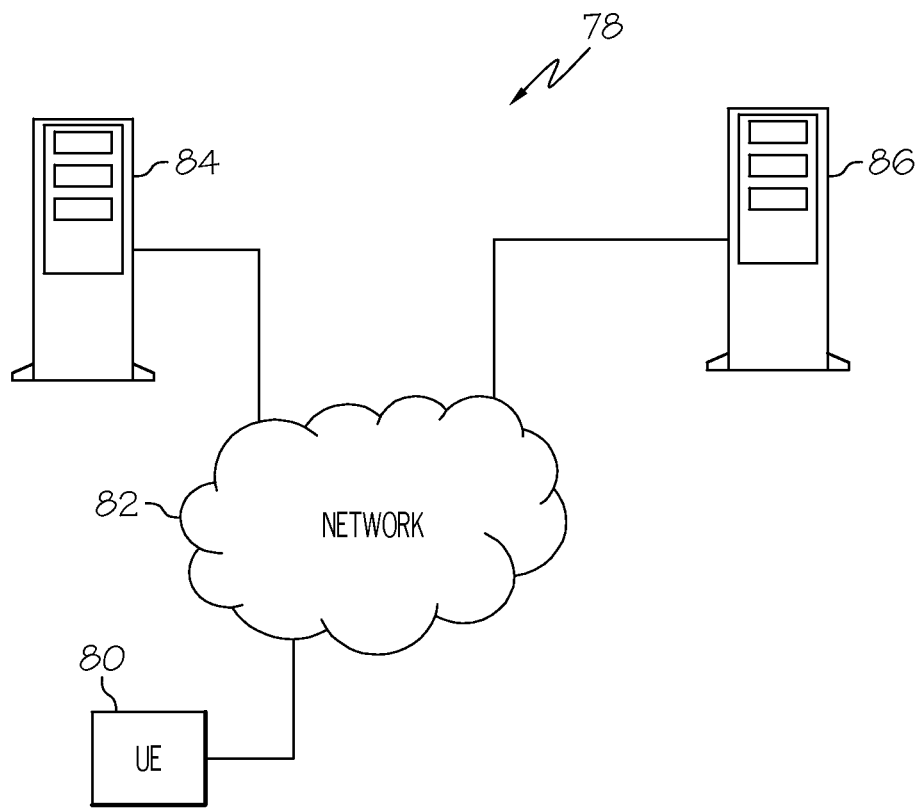
FIG. 3 is a block diagram of an example of a system configured to create a situational application according to an embodiment of the present invention.

FIG. 3 shows an architecture 78 in which a situational application may be created for one or more user equipment (UE) 80 devices. In the illustrated example, the UE 80, which can include web browsing capability, may be a personal computer (PC), notebook computer, personal digital assistant (PDA), wireless smartphone, or other device having access to one or more servers 84, 86, via a network 82. The UE 80 connection to the network 82 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. In addition, the network 82 can include any suitable combination of servers, access points, routers, base stations, mobile switching centers, public switching telephone network (PSTN) components, etc., to facilitate communication between the UE 80 and the servers 84, 86. The servers 84, 86, may be web-based servers that are able to respond to web page requests for content. Thus, the servers 84, 86, can have stored thereon hypertext markup language (HTML) and other markup language-encoded content, as well as databases and applications such as Java and other applications.

In one example, the UE 80 is a computer program product having a computer readable medium and computer usable code stored on the computer readable medium, where the computer usable code is configured to identify content from a plurality of web-based sources such as the servers 84, 86, wherein the content is to be associated with a user's interaction with the servers 84, 86. The code may also be configured to gather data associated with the content and generate a situational application based on the data. Portions or all of the code may be located remotely to the UE 80.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:
   identifying content from a plurality of sources located at a plurality of computer servers in response to a user interaction with the plurality of sources, wherein identifying content is to include recording one or more web browsing sessions;
   determining whether data associated with the content is mixable into a situational application, wherein said determining is performed automatically and is based on at least one of a visibility criteria, an inter-compatibility criteria, and an intra-compatibility criteria, and wherein recording the one or more web browsing sessions is to be deactivated based on a determination that the data associated with the content is not mixable into a situational application;
   gathering the data associated with the content if the data is mixable into the situational application;
   creating the situational application based on the data, wherein creating the situational application includes automatically selecting a component that enables the user to perform a task, and wherein the situational application is to include widgets and mashups received from different sources;
   providing a first option to the user to configure the situational application to include information related to the situational application; and
   providing a second option to the user to include additional information related to the situational application.

2. The method of claim 1, wherein the plurality of sources includes a plurality of web-based sources.

3. The method of claim 2, wherein the plurality of web-based sources includes a plurality of web sites.

4. The method of claim 3, wherein the content is generated by a plurality of web-based applications on the plurality of web sites.

5. The method of claim 4, wherein the plurality of web-based applications includes two or more of an instant messaging application, an e-mail application, a spreadsheet application, a word processing application, a search application, a media application, a login application and a blog site.

6. The method of claim 2, wherein the data includes at least one of an identifier for each source in the plurality of web-based sources, a browsing frequency for each source in the plurality of web-based sources, and a browsing order corresponding to the plurality of web-based sources.

7. The method of claim 6, wherein the data further includes at least two of metadata for activities conducted on a source in the plurality of web-based sources, a form accessed on a source in the plurality of web-based sources, a feed accessed on a source in the plurality of web-based sources, and an IFrame component of a source in the plurality of web-based sources.

8. The method of claim 1, further including:
   prompting the user for additional content to include in the situational application; and
   updating the situational application based on a response to the prompting.

9. A computer program product comprising:
   a computer readable storage device; and
   computer usable code stored on the computer readable storage device, where, if executed by a processor, the computer usable code causes the computer program product to:
   identify content from a plurality of sources in response to a user interaction with the plurality of sources, wherein identifying content is to include recording one or more web browsing sessions;
   determine whether data associated with the content is mixable into a situational application, wherein said determining is performed automatically and is based on at least one of a visibility criteria, an inter-compatibility criteria, and an intra-compatibility criteria, and wherein recording the one or more web browsing sessions is to be deactivated based on a determination that the data associated with the content is not mixable into a situational application;
   gather the data associated with the content if the data is mixable into the situational application;
   create the situational application based on the data, wherein creating the situational application includes automatically selecting a component that enables the user to perform a task, and wherein the situational application is to include widgets and mashups received from different sources;
   providing a first option to the user to configure the situational application to include information related to the situational application; and
   providing a second option to the user to include additional information related to the situational application.

10. The computer program product of claim 9, wherein the sources are to include a plurality of web sites.

11. The computer program product of claim 10, wherein the content is to be generated by a plurality of web-based applications.

12. The computer program product of claim 10, wherein the data is to include at least one of an identifier for each site in the plurality of web sites, a browsing frequency for each site in the plurality of web sites, and a browsing order corresponding to the plurality of web sites.

13. The computer program product of claim 9, wherein the computer usable code is further configured to include a plurality of widgets.

14. A computer program product comprising:
a computer readable storage device; and
computer usable code stored on the computer readable storage device, where, if executed by a processor, the computer usable code causes the computer program product to:
record a web browsing session;
identify content from a plurality of web sites visited during the web browsing session, the content identified in response to an interaction with the plurality of web sites and the content to be generated by a plurality of web-based applications on the plurality of web sites;
determine whether data associated with the content is mixable into a situational application, wherein said determining is performed automatically and is based on at least one of a visibility criteria, an inter-compatibility criteria, and an intra-compatibility criteria, and wherein recording the one or more web browsing sessions may be deactivated based on a determination that the data associated with the content is not mixable into a situational application;
gather the data associated with the identified content if the data is mixable into the situational application, the data to include at least one of an identifier for each site in the plurality of web sites, a browsing frequency for each site in the plurality of web sites, and a browsing order corresponding to the plurality of web sites;
create the situational application based on the data, wherein creating the situational application includes automatically selecting a component that enables the user to perform a task, and wherein the situational application is to include widgets and mashups received from different sources;
prompt the user for additional changes to the situational application, wherein the additional changes include a first option to the user to configure the situational application to include information related to the situational application, and a second option to the user to include additional information related to the situational application; and
update the situational application based on a response to the prompting.

15. The computer program product of claim 14, wherein the plurality of web-based applications includes at least one of an instant messaging application, an e-mail application, a spreadsheet application, a word processing application, a search application, a media application, a login application and a blog site.

16. The computer program product of claim 14, wherein the data is to further include at least one of metadata for activities conducted on a site in the plurality of web sites, a form accessed on a site in the plurality of web sites, a feed associated with a site in the plurality of web sites, and an IFrame component of a site in the plurality of sites.

17. The computer program product of claim 14, wherein the situational application is to include a plurality of widgets.

* * * * *